Patented Apr. 15, 1924.

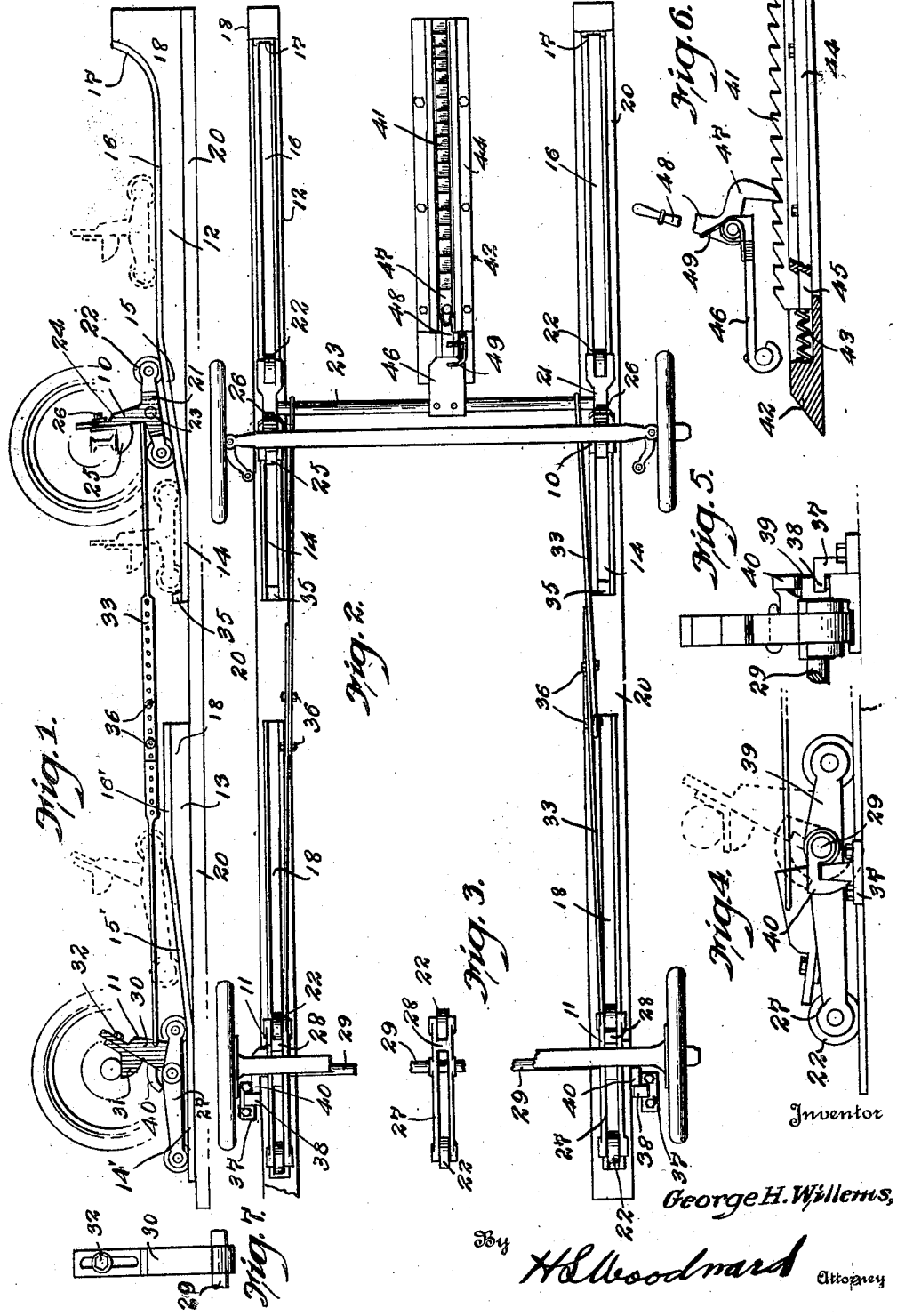

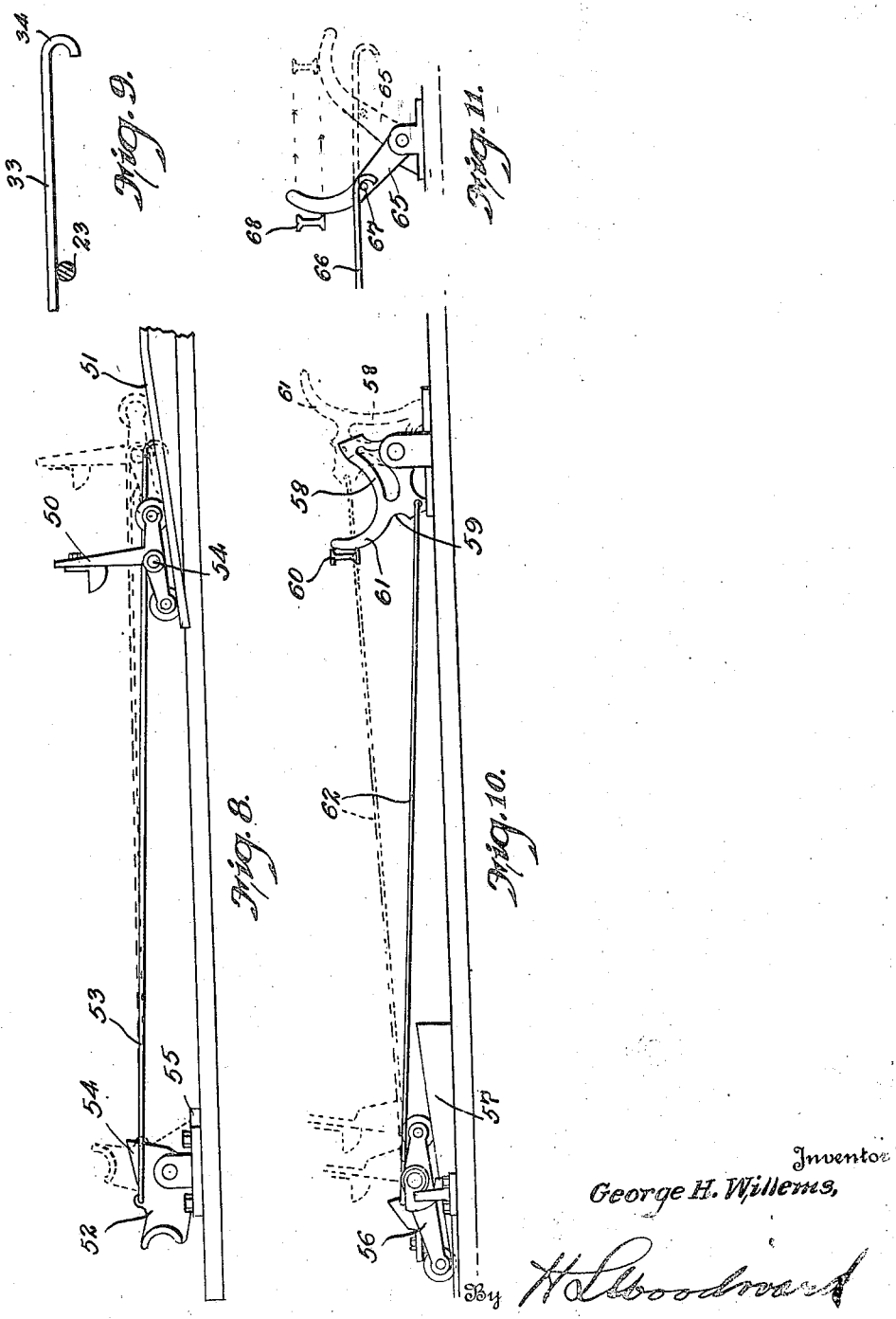

1,490,152

UNITED STATES PATENT OFFICE.

GEORGE H. WILLEMS, OF ROANOKE, ILLINOIS.

AUTOMATIC MOTOR-VEHICLE JACK DEVICE.

Application filed January 26, 1922. Serial No. 531,974.

*To all whom it may concern:*

Be it known that I, GEORGE H. WILLEMS, a citizen of the United States, residing at Roanoke, in the county of Woodford and State of Illinois, have invented certain new and useful Improvements in Automatic Motor-Vehicle Jack Devices, of which the following is a specification.

The invention has for an object to effect improvements in automatic automobile jacking devices, intended for use in garages to operate in elevating a motor vehicle by the effect of its own momentum or power when run into engagement with the apparatus. It is a particular aim to provide means which will be readily adjustable to accommodate itself to various sizes of machines, both as to length of wheel base and height of the axle. It is a further particular aim to give an improved elevating means which will operate without jar to the vehicle in effecting its elevation. A further important end sought to be attained is the adaptation of the device to operate without requiring the motor vehicle to be run at a certain particular speed, or to move a fixed distance after engagement with the lifting apparatus. That is to say, my device will operate when a motor vehicle driven by an inexperienced person is run into engagement therewith, even if the speed of the vehicle is not sufficient to carry it into the maximum elevated position. The invention also permits the elevation of one part of the vehicle only, if desired.

It is a still further object of the invention to provide a mechanism which will not require great accuracy in the guiding of the vehicle to be elevated, but which will operate even if the vehicle is set thereon at an angle to its normal path.

Additional objects, advantages and features of invention will appear from the construction, arrangement, and combination of parts involved, as may be understood from the following description and accompanying drawings, in which, Figure 1 is a side elevation of one embodiment of the invention, with certain parts omitted from the rear truck element in order to show the details of the truck parts.

Fig. 2 is a top plan view of the same apparatus without the omission of parts,

Fig. 3 is a detail top view of one of the truck elements with the jack leg omitted, Fig. 4 is a side elevation in detail of one of the trucks, Fig. 5 is a rear elevation thereof, Fig. 6 is a detail side elevation partly in section of the holding latch device, Fig. 7 is a detail elevation of one of the jack legs, Fig. 8 is a side elevation of a modification of the apparatus, Fig. 9 is a detail of the forward end of the link device between the front truck and rear truck, Fig. 10 is a side elevation of a still further modification, Fig. 11 is an elevational view of a third modification.

There is illustrated an elevator device which includes essentially two sets of truck elements 10 and 11, one to engage the front axle of a vehicle, and the other to engage under the rear axle thereof, the trucks traveling upon respective short sections of railway 12 and 13, each railway section or track having an inclined part, whereby when the vehicle is run into engagement with the trucks, its momentum will carry the trucks partly or entirely up the incline, lifting the vehicle, and a latch mechanism is provided which will hold the truck device against return from any point upon the incline or upper part of the track, until released. However, it is possible to substitute pivoted jack elements for the trucks at one end.

The front tracks 12 each includes a horizontal starting part 14, from which an inclined part 15 extends to an upper level portion 16 which terminates at the forward end in an abruptly upwardly curved portion 17, which is intended to serve as a stop to check forward movement of the truck, in case the vehicle is run thereupon at an excessive speed. Each rear track element includes a horizontal starting portion 14', the inclined part 15', and a top part 16', corresponding to those before described, but is not provided with the terminal upwardly inclined part. The track comprises grooved rail portions 18, having stringers 19 beneath the inclined and upper portions mentioned, and these in turn, together with the starting portion of each track are mounted upon base stringers 20, which extend continuously beneath both track elements at respective sides.

Each forward truck comprises a body 21 including a lower horizontal part forked at each end and having single wheels 22 mounted between the forks, of a width to fit snugly in the groove of the rails 16. A cross shaft 23 is fixed rigidly in the central part of the two forward trucks so as to hold them in fixed relation to each other. From the central part of each truck there extends upwardly a leg piece, 24 upon which there is vertically adjustable an axle bracket 25, secured in adjusted position by the bolt 26 at the forward side of the leg. Each rear truck includes a frame part 27 consisting of two side bars with an integral transverse connecting portion 28 at the forward part. Wheels 22 are mounted between these bars at the front and rear, similar to those before described and similarly fitted to the track. A shaft 29 connects the two rear trucks, mounted revolubly therein and having secured thereon between the side pieces of each frame a tiltable leg 30, having a forwardly extended base adapted to rest upon the connecting piece 28 of the frame, to check movement of the leg at its forward limit. The rear side of the leg is slightly inclined forwardly, in the present instance, when in erect position, the upper part being extended forwardly beyond the pivot and having vertically adjustable thereon a bracket piece 31 secured by a bolt 32. A longitudinally extensible link 33 connects the rear truck at each side to the forward trucks. The links 33 are connected to the forward extension 30 of the rear leg, so that when the rear legs are in lowered position, the links will be connected thereto at a point elevated above the pivot of the legs causing the legs to be drawn forwardly and upwardly by a pull upon the links in a horizontal direction. The forward ends of the links are formed with hooks 34 Fig. 9, and rest slidably upon the cross bar 23 of the forward trucks. In the normal initial position of the parts, the forward truck rests upon the part 14 of the track, against a stop lug 35 at the rear end of the track, as dotted in Fig. 1, the link projecting forwardly of the bar 23 a distance as shown in Fig. 9. The lengths of the links are adjusted by means of bolts 36 engaged in apertured flat parts of overlapped sections of the links. The brackets 25 are adjusted so that they will be disposed at a height to permit the forward axle of a vehicle to move thereover when the trucks are in initial position, and the brackets 31 of the rear trucks are similarly adjusted to permit the rear axle of a vehicle to move thereover into position to be lifted by upward movement of the trucks. In order to prevent the rear trucks from pulling forwardly before the jack legs have been properly elevated, a latch device is provided consisting of a stop 37 secured to the floor and having a horizontal lug 38 projected from its upper part, while on each outer end of the shaft 29, a keeper is secured having a sector 40 concentric with the shaft on its inner surface and arranged to engage behind the lug 38 and extend therebelow such distance that the lug will be engaged until the leg has been raised to a sufficient elevation, clearance of the sector from the lug 38 permitting the truck then to move forwardly.

The means for holding the parts in elevated position until released comprises a ratchet bar 41 having a limited sliding movement upon a base element 42, having a spring 43 confined between the base and rear part of the ratchet bar, the latter being held slidably upon the base by guide plates 44 engaged over flanges 45 upon the rack, the plates 44 being secured to the base 42. The bar 23 is provided with a forwardly projected support 46 upon which there is pivoted a dog 47 having a tooth to engage the ratchet 41, and provided with an upwardly projected hand lever 48 by which it may be operated to release the dog from the rack bar when desired. The dog is held yieldingly in engaged position by means of a spring 49 coacting between the lever 48 and support 46. By this arrangement, in case the forward truck moves upwardly on to the inclined part 17 of the track, after momentum of the vehicle has been checked and when the trucks return to the level part 16, engagement of the dog 47 with the rack bar will check movement of the vehicle rearwardly without shock, by reason of the cushioning effect of the spring 43.

There is illustrated in Fig. 8 a modification of the device in which the forward truck 50 is constructed in the same manner as the trucks 10 first described, and are mounted upon an inclined track way 51. In place of the rear trucks, however, there are provided pivoted jack legs 52, having their upper ends shaped suitably to engage the rear axle of a vehicle, and links 53 are connected to these legs and extended forwardly to be engaged by the cross bar 54 in the forward truck in the same manner as in the first described form of the invention to raise the leg 52 to engaging position, as the rear axle moves forwardly, so that the axle will thus be lifted. The legs 52 are provided with forwardly projected foot portions 54 to engage supporting plates 55 when they have moved slightly beyond dead center, serving thus to check the forward progress of the vehicle.

In Fig. 10 a further modification of the device is illustrated, in which trucks 56 are provided at the rear constructed in the same manner as the trucks 11 first described, but mounted upon a continuously inclined track portion 57. At the forward part of this device, pivoted jack legs 58 are provided, having a saddle recess 59 at their upper parts into which the front axle 60 of a vehicle may fit for lifting under forward progression. Each leg is provided at the forward part with a forwardly curved arm 61 which, when the leg is in rearwardly lowered position will project upwardly to a sufficient height to be engaged by the axle 60 and effect raising of the leg so that the axle will engage in the saddle recess as the leg is raised. A link 62 connected thereto and to the pivoted leg of the truck 56 serves to raise the last mentioned leg as the rear axle of the vehicle passes thereover. The element 61 causes a considerable movement of the leg 58 before the front axle gains support in the recess 59. It may be found desirable in connection with the first described form of the device, or with either of those later described to operate the link by which the rear axle jack legs are elevated by means of devices separate from the forward lifting elements. For this purpose, I have illustrated in Fig. 11 levers 65 which may be mounted closely adjacent each of the forward track ways of either of the already described forms of devices, or closely adjacent the leg 58, links 66 being provided which are initially hooked upon projections 67 upon the sides of the levers 65 and extended rearwardly and connected to the jack leg device as before shown and described. The levers 65 project upwardly and are curved forwardly at their outer parts so that they will be engaged at a suitable point by the forwardly moving axle 68 and borne forwardly, operating the rear device, the forwardly curved part being of such shape and dimension that after the rear lifting device is moved to operative position, the axle may pass clear over the lever as dotted in Fig. 11 at the right. The links 66 may also be slidable so that they may move forwardly when the vehicle continues its movement to further stages, as also dotted in Fig. 11.

What is claimed is:

A front axle engaging and supporting element mounted for movement by a front axle, a rear axle supporting device comprising a truck, a pivoted arm thereon, having movement rearwardly of its operative position, a connection between the first named element and the arm whereby the arm will be raised from inoperative position under axle-engaging movement of the first named element, a stop beside the path of the truck, and a sector arm on the pivoted arm concentric with the pivot and arranged to engage said stop when the pivoted arm is in inoperative position, to oppose movement of the truck and hold it in initial position until the pivoted arm is in full load carrying position.

In testimony whereof I have affixed my signature in presence of two witnesses.

GEORGE H. WILLEMS.

Witnesses:
IDA DE WILDE,
JOHN E. WOLTZEN.